United States Patent
Juels et al.

(10) Patent No.: US 10,104,104 B1
(45) Date of Patent: Oct. 16, 2018

(54) SECURITY ALERTING SYSTEM WITH NETWORK BLOCKADE POLICY BASED ON ALERT TRANSMISSION ACTIVITY

(71) Applicant: EMC IP Holding Company LLC, Hopkinton, MA (US)

(72) Inventors: Ari Juels, Brookline, MA (US); Nikolaos Triandopoulos, Arlington, MA (US); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 276 days.

(21) Appl. No.: 13/922,724

(22) Filed: Jun. 20, 2013

Related U.S. Application Data

(63) Continuation-in-part of application No. 13/537,981, filed on Jun. 29, 2012.

(51) Int. Cl.
*H04L 29/06* (2006.01)

(52) U.S. Cl.
CPC .............................. *H04L 63/1425* (2013.01)

(58) Field of Classification Search
CPC ... H04L 41/069; H04L 41/0631; H04L 63/16; H04L 63/20; H04L 63/1416; H04L 63/1425; G06F 21/554; G06F 21/606
USPC .... 713/168, 150–152, 160, 161, 176; 726/4, 726/22, 23, 25, 26
See application file for complete search history.

(56) References Cited

U.S. PATENT DOCUMENTS

| | | | |
|---|---|---|---|
| 2004/0049693 A1* | 3/2004 | Douglas ........................ | 713/200 |
| 2007/0136480 A1* | 6/2007 | Stephenson et al. ......... | 709/227 |
| 2008/0117029 A1* | 5/2008 | Dohrmann et al. ...... | 340/286.02 |
| 2014/0126469 A1* | 5/2014 | Youtz et al. .................. | 370/328 |

* cited by examiner

*Primary Examiner* — Joseph P Hirl
*Assistant Examiner* — Kalish Bell
(74) *Attorney, Agent, or Firm* — Ryan, Mason & Lewis, LLP

(57) ABSTRACT

A security alerting system is provided with a network blockage policy based on alert transmission activity. Alert messages from a Security Alerting System executing on a host indicating a potential compromise of a protected resource are processed by determining if a number of buffer contents received from the host within a predefined time interval satisfies a predefined criteria, the buffer content comprising one or more of the alert messages from the Security Alerting System; and blocking a network connection of the host if the number of buffer contents received from the host within the predefined time interval does not satisfy the predefined criteria. The blocked network connection of the host can optionally be restored when a valid buffer content is received from the host. The predefined criteria is based on the alerting activity of the host.

20 Claims, 2 Drawing Sheets

SECURITY ALERTING SYSTEM WITH NETWORK BLOCKADE POLICY BASED ON ALERT TRANSMISSION ACTIVITY

CROSS-REFERENCE TO RELATED APPLICATIONS

The present application is a continuation-in-part of U.S. patent application Ser. No. 13/537,981(now U.S. Pat. No. 9,160,539), filed Jun. 29, 2012, entitled "Methods and Apparatus for Secure, Stealthy and Reliable Transmission of Alert Messages from a Security Alerting System," incorporated by reference herein.

FIELD OF THE INVENTION

The present invention relates generally to techniques for secure transmission of messages over a network or other types of communication systems.

BACKGROUND OF THE INVENTION

Security Alerting Systems (SASs) generate security-related alert messages indicating a potential compromise of a protected resource, such as a computing device. The alerts are transmitted to a trusted receiver for analysis and action. U.S. patent application Ser. No. 13/537,981(now U.S. Pat. No. 9,160,539), filed Jun. 29, 2012, entitled "Methods and Apparatus for Secure, Stealthy and Reliable Transmission of Alert Messages from a Security Alerting System," discloses methods and apparatus for secure transmission of alert messages over a message locking channel (MLC). Alert messages are buffered at the monitored endpoint and transmitted to a collection server, such as a Security Information Event Management (SIEM) server, for further security analytics processing.

These regular buffer transmissions correspond to a special type of "heartbeat" that constitutes an additional assurance level. Whenever heartbeat transmissions are not received as expected, a special type of "heartbeat" alert is produced by the collection server.

When "heartbeat" alerts occur, however, the cause of such alerts cannot be clearly identified. For an adversarial heartbeat alert, the host was compromised by an attacker consequently blocking some buffer transmissions. For a benign heartbeat alert, network failures resulted in significant delays or loss of normally transmitted buffers. An attacker can take advantage of this ambiguity to hide its actions while being in full control of an invisible victim host.

A need therefore exists for a network blockage policy that limits the network capabilities of a device when a "heartbeat" alert has been raised.

SUMMARY OF THE INVENTION

The present invention in the illustrative embodiments described herein provides a security alerting system with a network blockage policy based on alert transmission activity. According to one aspect of the invention, alert messages from a Security Alerting System executing on a host indicating a potential compromise of a protected resource are processed by determining if a number of buffers received from the host within a predefined time interval satisfies a predefined criteria, the buffer comprising one or more of the alert messages from the Security Alerting System; and blocking a network connection of the host if the number of buffers received from the host within the predefined time interval does not satisfy the predefined criteria. The blocked network connection of the host can optionally be restored when a buffer is received from the host.

Generally, the predefined criteria is based on alerting activity of the host. In one exemplary embodiment, the predefined criteria may require that one buffer is received from the host within the predefined time interval. In another variation, the predefined criteria comprises whether more than $\beta$ time intervals have elapsed without receiving a buffer, for a parameter setting $\beta > |B|/\tau$, where $|B|$ is a size of the buffer and $\tau$ denotes an estimate of a maximum number of alerts written by the host per time interval under non-adversarial conditions.

The communication techniques of the illustrative embodiments overcome one or more of the problems associated with the conventional techniques described previously, and permit devices to securely transmit alert messages from a Security Alerting System. Moreover, no modification of the applications or communication protocols is required. Among other benefits, the alert messages permit real-time detection of the potential compromise of the protected resource. These and other features and advantages of the present invention will become more readily apparent from the accompanying drawings and the following detailed description.

DETAILED DESCRIPTION

Figure 1:
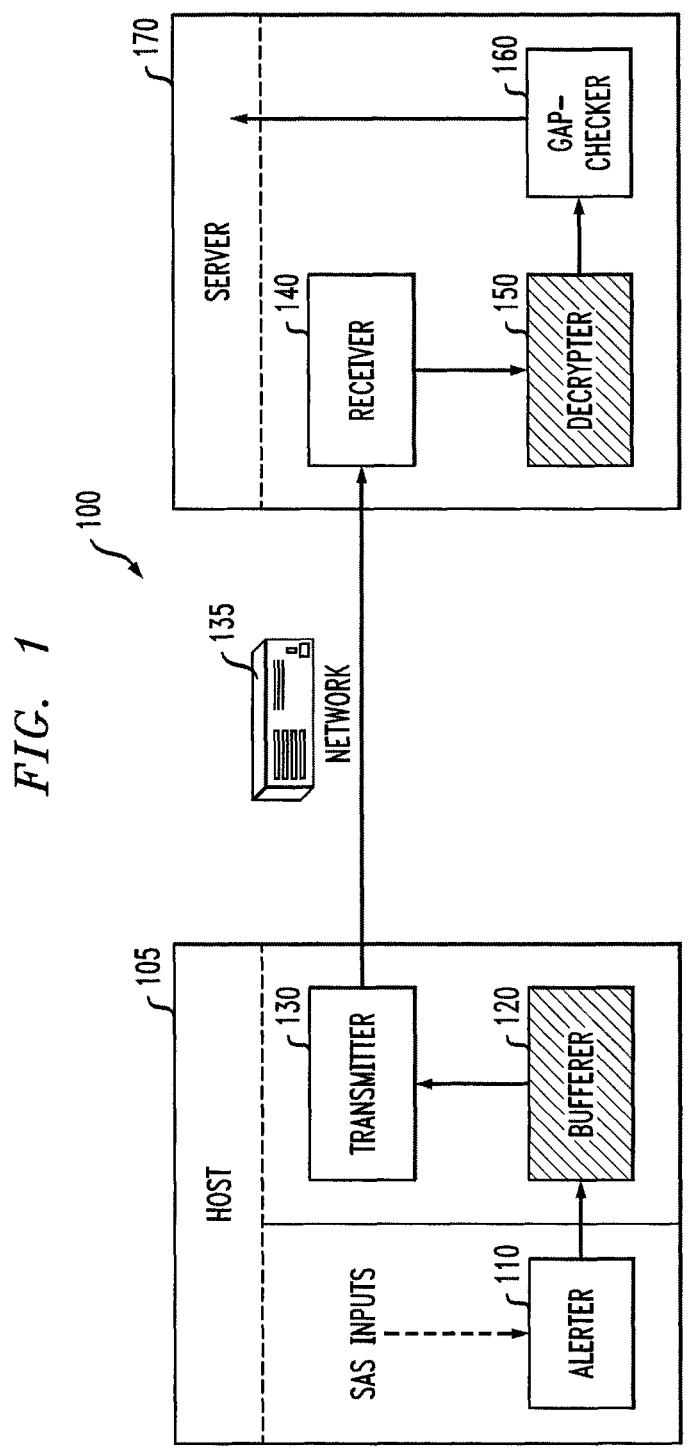
FIG. 1 illustrates an exemplary message locking channel and corresponding system architecture for reliable collection of security alerts that incorporate aspects of the present invention.

The present invention provides methods and apparatus for secure transmission of alert messages over a message locking channel using dynamic buffer storage. According to one aspect of the invention, when a client machine in an enterprise network fails to transmit its message alert buffer to an alert-processing server within a predefined time interval (for example, after a heartbeat alert has been raised), the server remotely blocks the network connection of the client indefinitely until the server receives a correct buffer from the blocked client.

Message-Locking Channels

Message-locking channels secure alert messages and ensure their delivery (or a telltale delivery-failure) after compromise, while they are still buffered on the host. Messages should be protected against deletion and tampering on a device that the attacker controls, i.e., they need integrity. Messages should also be concealed. To ensure that an attacker cannot learn whether an SAS has detected the presence of the attacker, it should not be possible to learn whether there are any buffered alert messages at all (i.e., stealthiness). As discussed hereinafter, the problem of message integrity is largely addressed using forward-secure logging, in which message-signing keys are continuously generated and then discarded after use, so messages cannot be replaced.

A message-locking channel (MLC) provides forward-secure integrity and encryption. By combining cryptographic protections with a data structure and buffer transmission protocol that are invariant to the number of alert messages and their buffering history, the MLCs also provide stealthiness.

The exemplary message-locking channels (MLC) confer three properties on messages inserted into the channel via a host-side buffer:

(i) Integrity: Even after compromising a host and learning its full state (including cryptographic keys), an adversary cannot modify, reorder, or otherwise tamper with buffered messages without detection. Note that a digital signature (or message-authentication code (MAC)) alone, does not achieve this property: An adversary learns the signing key after the host is compromised and the adversary can then forge messages. That is why forward security is an important part of the MLC.

(ii) Stealthiness: An adversary cannot tell what messages are present in an MLC buffer, i.e., messages enjoy confidentiality. But the stealthiness property of an MLC is even stronger than confidentiality: A powerful adversary, one that intercepts all host-to-server transmissions prior to compromise and learns the full state of the host after compromise, cannot tell if any messages have been inserted into the buffer.

(iii) Persistence: Buffer contents may be retransmitted an arbitrary number of times without loss of forward-secure integrity or stealthiness, ensuring that even isolated alert messages of rare events eventually reach the trusted service despite possible transmission failures.

As indicated above, an MLC secures the host-to-server chain of custody in an SAS system. The exemplary MLC implements a low-level crypto-assisted reliable channel that, even under adversarial conditions, ensures intact and stealthy delivery of transmitted messages to a remote server.

FIG. 1 illustrates an exemplary message-locking channel 100 and corresponding system architecture for reliable collection of security alerts in which aspects of the present invention may be employed. As discussed hereinafter, the exemplary message-locking channel comprises a bufferer 120 and a decrypter 150. The SAS components that generate alert messages are generally referred to in FIG. 1 as an alerter module 110. Generally, the alerter module 110 monitors the environment of a host 105 to identify events that match one of a set of specified alert rules. When an event triggers a rule, the alerter 110 outputs a distinct alert message. An alert template may either be static (predefined at some setup time for the host 105) or dynamic (updated regularly or on-demand through communication with the server 170). Rules may take any form. Rules may test individual state variables (specified as what is generally called a signature) or they may correlate more than one event via a predicate or classifier. Moreover, as the present invention supports stealthy erasure of rules, it permits enhanced functionality in the alerter 110. The alerter 110 may tag select rules as "vanishing." When such a rule is triggered, the rule is erased from the current rule set.

The interface of the exemplary alerter 110 is unidirectional. The alerter 110 outputs alert messages that are consumed by the message-locking channel. Although many architectures are possible, given the emphasis on critical alerts, in a canonical operational setting, the SAS 110 may send only high severity messages (e.g., those that seem to indicate impending compromise) through the message-locking channel, and other less critical messages through an ordinary low-priority transport layer. This high-priority channel will carry less traffic and thus will impose lower overhead due to buffer retransmissions.

As shown in FIG. 1, a bufferer module 120 controls the MLC core message buffer. The bufferer 120 receives messages from the alerter 110 and inserts them into the buffer. The bufferer 120 also receives buffer-wrapping requests from the transmitter 130 and responds by returning the current buffer contents in a securely encapsulated form. The bufferer module 120 is also responsible for maintaining the secret state of the MLC and updating cryptographic keys. The exemplary bufferer 120 accepts two calls: a Write call from the alerter 110 to insert a message to the MLC buffer and a Wrap call from the transmitter 130 requesting encapsulated export of the buffer contents. The bufferer 120 does not discard messages from the buffer when they are transmitted. A message keeps being encapsulated and transmitted until it is overwritten. This is the feature of persistence that helps overcome adversarial network disruptions.

A transmitter module 130 schedules and executes buffer transmissions from the host 105 to the server 170. In a basic implementation, transmissions may be scheduled at regular intervals of time as a "heartbeat." The transmitter module 130 sends Wrap requests to the bufferer 120 and transmits encapsulated buffers to the server 170 over the network 135 using any suitable protocol.

A receiver module 140 receives encapsulated-buffer transmissions on the server 170 from the host-based transmitter 130 over the network 135. When the receiver module 140 receives a transmission pushed from the host 105, the receiver module 140 relays it with a Read instruction to a decrypter 150.

The decrypter 150, in response to a Read request from the receiver 140, performs cryptographic unwrapping and processing of the accompanying encapsulated buffer. The decrypter 150 verifies the integrity of the buffer and either outputs its constituent messages, or else outputs ⊥ symbol indicating a buffer corruption. The decrypter 150 labels messages with their (verified) buffer sequence numbers.

A gap-checker 160 looks for lost messages in the SAS message stream, which cause it to output an alert referred to as a gap alert. Gap alerts may be caused by one of two things: (1) Dropped or suppressed buffers or (2) Overwriting of alerts in the buffer by malicious buffer-stuffing on the compromised host 105, as discussed herein.

As buffer messages are labeled with verified sequence numbers, gap checking requires verification that no sequence numbers go missing in the message stream. Because messages continue to be transmitted until overwritten, note that in normal operation sequence numbers will generally overlap between buffers. The gap-checker 160 can optionally filter out redundant messages.

To detect an adversary that suppresses buffer transmission completely, the gap-checker 160 also issues a gap alert if buffers have stopped arriving for an extended period of time, as discussed below.

The gap checker 160 detects when a true gap occurs, i.e., there are no false-negatives in its gap-alert output. To ensure a low false-positive rate, i.e., to prevent spurious detection of maliciously created gaps, calibration is required.

If an attacker suppresses buffer transmission completely, then the gap-checker 160 will cease to receive buffers. This is a detectable event. The gap-checker 160 issues a gap alert if more than $\beta$ seconds have elapsed without the receipt of a buffer.

In addition, the gap-checker 160 comprises processing software, hardware and memory (not shown in FIG. 1) to implement a network blockage process 200, discussed further below in conjunction with FIG. 2, that incorporates aspects of the present invention. It is noted that the gap-checker 160 is responsible for initiating the enforcement of the network-blocking policy. The actual blocking task, however, may be implemented by another process (e.g., a monitoring process, system administrator, network switch, VPN server, etc.) or a controller, referred to herein as the "entry-point" (of the connection of the host to the enterprise network).

The maximum SAS message-generation rate, τ, of normal hosts is characterized experimentally below. It has been shown that the false-positive gap-alert rate can be driven extremely low with moderate buffer sizes under non-adversarial conditions.

The exemplary MLC buffer is a first-in-first-out (FIFO) buffer with wraparound. Any tampering with the buffer or writing of invalid messages causes its contents to be indelibly replaced with a special corruption symbol ⊥ (again, in a cryptographic abstraction). Each encapsulated buffer is labeled with a forward-secure sequence number j, meaning that even after complete compromise, an attacker can only increase it, not decrease it. Each encapsulated buffer also carries the current message sequence number $s_j$.

The goal of an adversary when compromising a host 105 is to suppress buffered alerts generated during the critical window of infection. The adversary can do so during the post-compromise period 160, for example, using a buffer overwriting attack, whereby an adversary can write messages into the MLC buffer without destroying it. By writing relatively benign messages, i.e., exploiting buffer wraparound to refill the buffer, it can overwrite and thereby destroy messages generated during the critical window.

The sender S maintains the following three components of state information:

1. a secret key σ (also kept by the receiver R);
2. a buffer C, C=(C[0], C[1], . . . , C[R−1]), initially empty, seen as an array of size R+1, where C[i], 0≤i≤R, denotes the ith position in C;
3. a current index I, initially pointing to a random position in C, and itself stored at C[R].

The buffer data structure is implemented as a class that exports two methods, Write and Wrap. When the host-based application is started it creates a new buffer, which remains held in memory, and interacts with the Bufferer 120 and Transmitter 130. The size of the buffer is specified at creation time and its starting position is randomly selected.

For a more detailed discussion of the MLC and other components of FIG. 1, see U.S. patent application Ser. No. 13/537,981(now U.S. Pat. No. 9,160,539), filed Jun. 29, 2012, entitled "Methods and Apparatus for Secure, Stealthy and Reliable Transmission of Alert Messages from a Security Alerting System," incorporated by reference herein.

Heartbeat Gap Alerts

In an alert blocking attack, an attacker that compromises the host may: (1) quickly disrupt the alerting operation, so that the transmission of the buffer (containing possible alerts that are indicative of the attack) is blocked, and (2) then, temporarily or permanently stop buffer transmissions. To tolerate this attack, a heartbeat gap check is employed at the collection server where a Heartbeat Gap Alert is raised if a small number of transmission periods have passed without a corresponding buffer being received by the server.

The Heartbeat Gap Alert is raised only after a small number of buffers have not been received, and typically not immediately after a buffer fails to reach the server. This small slack is helpful to reduce the false positive rate of this alerting signal due to benign network failures that may affect the buffer transmissions. Indeed, to comply with legacy logging systems, an unreliable communication to the server (e.g., using UDP packets) may be used and, in general, relaying the host-to-server communication over a dedicated secure channel with buffer-delivery acknowledgements and buffer retransmissions would create a big overhead and would be not viable for host machines that get disconnected from the enterprise network (e.g., when users get their laptops at home). Then, in such settings, benign network failures may introduce lost or delayed buffer transmissions which affects the heartbeat operation.

When unreliable transmissions (e.g., UDP packets) are used for relaying the secure messages (i.e., the buffer), it is possible that benign network failures pollute the heartbeat signaling at the gap-checker 160. When the receiving server 170 fails to receive a heartbeat and, in particular, when a Heartbeat Gap Alert is raised, the real cause is unclear. Indeed, the server 170 cannot distinguish between the following two cases.

In an adversarial failure, buffer transmissions were not successful because of an attack-related failure of the host-side system, that is, due to a compromise by an attacker or an active network attack blocking buffer transmissions. In a benign failure, buffer transmissions were not successful because of accidental problems with the network, i.e., due to temporary network disruptions or network congestion and the like.

An attacker that adversarially delays or blocks buffer transmissions can cause a device to remain connected to the network while an alert goes unprocessed and remediated well beyond the heartbeat transmission interval.

Network Blockage Policy

According to one aspect of the invention, when a client machine 105 in an enterprise network 135 fails to transmit its buffer to an alert-processing server 170 within the allowed time intervals, the server 170 remotely blocks the network connection of the client 105, indefinitely by the server 170, until the time that the server 170 receives a correct (i.e., current, well-formatted and verifiable) buffer from the blocked client 105. The client 105 may be embodied as, e.g., a laptop machine, and is connected to an enterprise network 135, for example, through communication to a proxy or entry-point server that may conceptually overlap with the receiving server 170.

Figure 2:
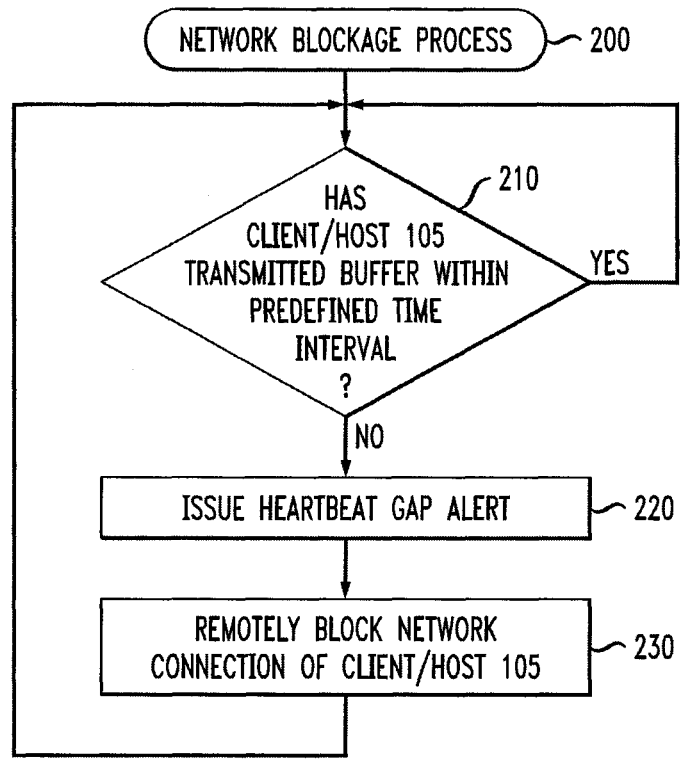
FIG. 2 is a flow chart describing an exemplary implementation of a network blockage process incorporating aspects of the present invention.

FIG. 2 is a flow chart describing an exemplary implementation of a network blockage process 200 incorporating aspects of the present invention. As shown in FIG. 2, the network blockage process 200 initially performs a test during step 210 to determine if the Client/Host 105 has transmitted a buffer within a predefined time interval. If it is determined during step 210 that the Client/Host 105 has transmitted a buffer within a predefined time interval, then program control returns to step 210 to continue monitoring for buffer transmissions.

If, however, it is determined during step 210 that the Client/Host 105 has not transmitted a buffer within a predefined time interval, then Heartbeat Gap Alert is issued during step 220 and the network blockage process 200 remotely blocks the network connection of the client/host 105 during step 230 until a valid buffer is received from the client/host 105 during step 210.

Aspects of the present invention provide the following characteristics:

1. When there is a benign network failure, the network blockage enforced by the network blockage process 200 does not affect the client 105; or
2. When there is an attack on the client 105, the network blockage imposed by the network blockage process 200 is an appropriate response.

The disclosed network blockage policy implemented by the network blockage process 200 is based on the client's alerting activity (i.e., the overall activity of the client's machine with respect to transmissions of produced security-related alerts), as opposed to existing network blocking policies that are based solely on the client's system configuration. For instance, there exist policies that block access to a corporate network if a client machine that tries to establish a VPN connection is found not to have an up-to-date anti-malware protection software, or is deemed to have a high-risk OS configuration.

In the event of message disruptions, if an attacker suppresses buffer transmission completely, the gap-checker module 160 will cease to receive buffers. The gap-checker 160 will issue a Heartbeat Gap Alert if more than $\beta$ seconds have elapsed without the receipt of a buffer, for parameter setting $\beta > |B|/\tau$, where $|B|$ is the size of the buffer and $\tau$ denotes an estimate of the maximum number of alerts written by the host 105 per second under normal (non-adversarial) conditions. The choice of B dictates a trade-off between the speed at which alerts can be written to the buffer and the rate at which they must be sent to the server 170. Also note that the above check is the task of the gap-checker 160, rather than other modules of receiver 140 or decrypter 150, as the gap-checker 160 can identify situations in which buffers arrive, but are replays, and thus a Heartbeat Gap Alert is appropriate.

As discussed above, benign transmission failures cannot be distinguished from adversarial, although network "liveness checks" can help. While there are many possible policies for transmission-failure alerts, in reliable networks, the SAS is best coupled with an access policy in which a host 105 that triggers a transmission-failure alert after $\beta$ seconds is disconnected from network services other than the SAS. Its connection is restored only when the SAS again receives a buffer from the host 105 and can detect alerts. In a benign network outage, this policy will not adversely affect hosts 105, as hosts 105 will lack network service anyway. An adversary that suppresses buffer transmission, though, will cut itself off from the network until the SAS can analyze any relevant alerts. Thus, such interfacing of the SAS with network-access policies caps the maximum possible interval of lost visibility.

Figure 3:
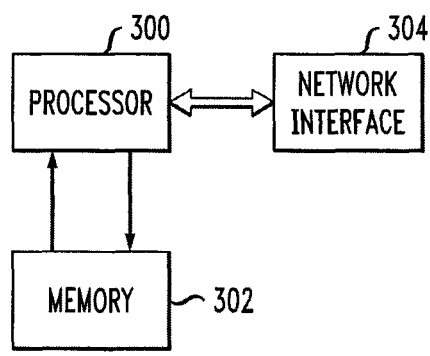
FIG. 3 shows one possible implementation of a given one of the processing devices of the message locking channel system of FIG. 1.

FIG. 3 shows one possible implementation of a given one of the processing devices of the message locking channel system. The device in this implementation includes a processor 300 coupled to a memory 302 and a network interface 304. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 302 and executed by the corresponding processor 300. The memory 302 is also used for storing information used to perform computations or other operations associated with the secure alerting protocols of the invention.

CONCLUSION

As previously indicated, the above-described embodiments of the invention are presented by way of illustrative example only. Numerous variations and other alternative embodiments may be used, as noted above. Existing Security Alerting Systems (SASs) lack countermeasures against sophisticated attackers that take control of an endpoint machine. Often during and always after complete host compromise, an attacker can destroy evidence of its malfeasance and gather intelligence about the instrumentation of the SAS.

Aspects of the present invention provides message-locking channels that advance the state of the art in SAS alert-relaying mechanisms by delivering a secure chain of custody for the stream of security alerts generated by any SAS system. The message-locking channels provide a cryptographic tool capable of transmitting alerts from a host 105 to a security-monitoring server 170 in an integrity-protected, stealthy and persistent manner.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide secure transmission of messages over a silent alarm channel. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method performed by a server that is part of a network for processing alert messages from a Security Alerting System executing on a host indicating a potential compromise of a protected resource, comprising:
   determining if a number of buffer contents comprising said alert messages received from said host within a predefined time interval satisfies a predefined criteria, wherein said alert messages are generated by said Security Alerting System, wherein said number comprises only valid buffer contents received from said host;
   determining whether said received buffer content comprises a replayed buffer content;
   triggering, by said server, in response to said number of buffer contents comprising said alert messages received from said host within said predefined time interval failing to satisfy said predefined criteria, a blocking of access of said host to services of said network except for communications of said Security Alerting System executing on said host with said server; and restoring said blocked access of said host to said network when a valid buffer content is received from said host.

2. The method of claim 1, further comprising the step of issuing a heartbeat gap alert if a valid buffer content is not received from said host within a predefined time interval.

3. The method of claim 1, wherein said predefined criteria comprises receiving one or more valid buffer contents from said host within said predefined time interval.

4. The method of claim 1, wherein said blocking of said access of said host to said network is triggered when more than $\beta$ time intervals have elapsed without receiving a valid buffer content, for parameter setting $\beta > |B|/\tau$, where $|B|$ is a buffer size and $\tau$ denotes an estimate of a maximum number of alerts written by said host per time interval under non-adversarial conditions.

5. The method of claim 1, wherein said predefined criteria is based on alerting activity of said host.

6. A non-transitory machine-readable recordable storage medium for storing one or more software programs implemented by a server that is part of a network for processing alert messages from a Security Alerting System executing on a host indicating a potential compromise of a protected resource, wherein the one or more software programs when executed by one or more processing devices implement the following steps:
determining if a number of buffer contents comprising said alert messages received from said host within a predefined time interval satisfies a predefined criteria, wherein said alert messages are generated by said Security Alerting System, wherein said number comprises only valid buffer contents received from said host;
determining whether said received buffer content comprises a replayed buffer content;
triggering, by said server, in response to said number of buffer contents comprising said alert messages received from said host within said predefined time interval failing to satisfy said predefined criteria, a blocking of access of said host to services of said network except for communications of said Security Alerting System executing on said host with said server; and
restoring said blocked access of said host to said network when a valid buffer content is received from said host.

7. A server apparatus that is part of a network for processing an alert message from a Security Alerting System executing on a host indicating a potential compromise of a protected resource, the server apparatus comprising:
a memory; and
at least one hardware device, coupled to the memory, operative to implement the following steps:
determine if a number of buffer contents comprising said alert messages received from said host within a predefined time interval satisfies a predefined criteria, wherein said alert messages are generated by said Security Alerting System, wherein said number comprises only valid buffer contents received from said host;
determining whether said received buffer content comprises a replayed buffer content;
trigger, by said server, in response to said number of buffer contents comprising said alert messages received from said host within said predefined time interval failing to satisfy said predefined criteria, a blocking of access of said host to services of said network except for communications of said Security Alerting System executing on said host with said server; and
restore said blocked access of said host to said network when a valid buffer content is received from said host.

8. The server apparatus of claim 7, wherein said at least one hardware device is further configured to issue a heartbeat gap alert if a valid buffer content is not received from said host within a predefined time interval.

9. The server apparatus of claim 7, wherein said predefined criteria comprises receiving one or more valid buffer contents from said host within said predefined time interval.

10. The server apparatus of claim 7, wherein said blocking of said access of said host to said network is triggered when more than $\beta$ time intervals have elapsed without receiving a valid buffer content, for parameter setting $\beta > |B|/\tau$, where $|B|$ is a buffer size and $\tau$ denotes an estimate of a maximum number of alerts written by said host per time interval under non-adversarial conditions.

11. The server apparatus of claim 7, wherein said predefined criteria is based on alerting activity of said host.

12. The non-transitory machine-readable recordable storage medium of claim 6, further comprising the step of issuing a heartbeat gap alert if a valid buffer content is not received from said host within a predefined time interval.

13. The non-transitory machine-readable recordable storage medium of claim 6, wherein said predefined criteria comprises receiving one or more valid buffer contents from said host within said predefined time interval.

14. The non-transitory machine-readable recordable storage medium of claim 6, wherein said predefined criteria is based on alerting activity of said host.

15. The non-transitory machine-readable recordable storage medium of claim 6, wherein said blocking of said access of said host to said network is triggered when more than $\beta$ time intervals have elapsed without receiving a valid buffer content, for parameter setting $\beta > |B|/\tau$, where $|B|$ is a buffer size and $\tau$ denotes an estimate of a maximum number of alerts written by said host per time interval under non-adversarial conditions.

16. The method of claim 1, wherein said blocking of said access of said host to said network is triggered when more than a predefined number of time intervals have elapsed without receiving a valid buffer content, where said predefined number of time intervals is based on a buffer size and an estimate of a maximum number of alerts written by said host per time interval under non-adversarial conditions.

17. The server apparatus of claim 7, wherein said blocking of said access of said host to said network is triggered when more than a predefined number of time intervals have elapsed without receiving a valid buffer content, where said predefined number of time intervals is based on a buffer size and an estimate of a maximum number of alerts written by said host per time interval under non-adversarial conditions.

18. The method of claim 1, further comprising the step of filtering one or more redundant messages.

19. The non-transitory machine-readable recordable storage medium of claim 6, further comprising the step of filtering one or more redundant messages.

20. The server apparatus of claim 7, wherein said at least one hardware device is further configured to filter one or more redundant messages.

* * * * *